United States Patent [19]

Kuramochi et al.

[11] Patent Number: 4,499,789
[45] Date of Patent: Feb. 19, 1985

[54] AUTOMATIC TRANSMISSION WITH OVERDRIVE HOUSING INCLUDING ITS OWN ACCUMULATOR

[75] Inventors: Koujiro Kuramochi; Tokuyuki Takahashi, both of Toyota, Japan

[73] Assignee: Toyota Jidosha Kabushiki Kaisha, Toyota, Japan

[21] Appl. No.: 425,260

[22] Filed: Sep. 28, 1982

[30] Foreign Application Priority Data

Jun. 3, 1982 [JP] Japan .................. 57-95736

[51] Int. Cl.³ ...................... F16H 37/04; F16H 57/02
[52] U.S. Cl. .................. 74/740; 74/606 R; 74/745; 74/752 C
[58] Field of Search ............... 74/606 R, 700, 740, 74/745, 752 C

[56] References Cited

U.S. PATENT DOCUMENTS

| | | | |
|---|---|---|---|
| 3,724,292 | 4/1973 | Borman | 74/864 |
| 3,913,415 | 10/1975 | Herr | 74/752 C |
| 4,203,331 | 5/1980 | Shindo et al. | 74/606 R |
| 4,241,622 | 12/1980 | Kubo et al. | 74/740 |
| 4,271,721 | 6/1981 | Yamamori et al. | 74/606 R X |
| 4,274,303 | 6/1981 | Shindo et al. | 74/740 |
| 4,347,765 | 9/1982 | Leonard et al. | 74/752 C X |
| 4,368,650 | 1/1983 | Numazawa et al. | 74/740 |
| 4,416,168 | 11/1983 | Arai et al. | 74/740 |

FOREIGN PATENT DOCUMENTS

| | | | |
|---|---|---|---|
| 54-138948 | 10/1979 | Japan | 74/740 |
| 54-141949 | 11/1979 | Japan | 74/740 |
| 55-54750 | 4/1980 | Japan | 74/740 |

OTHER PUBLICATIONS

*Automotive Products Company, Ltd.*

Primary Examiner—Lawrence J. Staab
Assistant Examiner—Dwight G. Diehl
Attorney, Agent, or Firm—Stevens, Davis, Miller & Mosher

[57] ABSTRACT

An automatic transmission includes a transaxle casing and an overdrive casing fixed to the transaxle casing. A gear transmission mechanism is housed within the transaxle casing, and an overdrive mechanism is housed within the overdrive casing. Each of these is hydraulically controlled. A first hydraulic fluid accumulator for moderating sudden pressure changes within a part of a control mechanism for the gear transmission mechanism is housed within the transaxle casing, and a second hydraulic fluid accumulator for moderating sudden pressure changes within a part of a control mechanism for the overdrive mechanism is housed within the overdrive casing. Thereby a common type of transaxle casing may be used both for an automatic transmission assembly which incorporates such an overdrive mechanism and for an automatic transmission assembly which does not incorporate such an overdrive mechanism, and in the latter case no waste of space within the transaxle casing due to the unnecessary provision of space for the second hydraulic fluid accumulator need occur.

2 Claims, 1 Drawing Figure

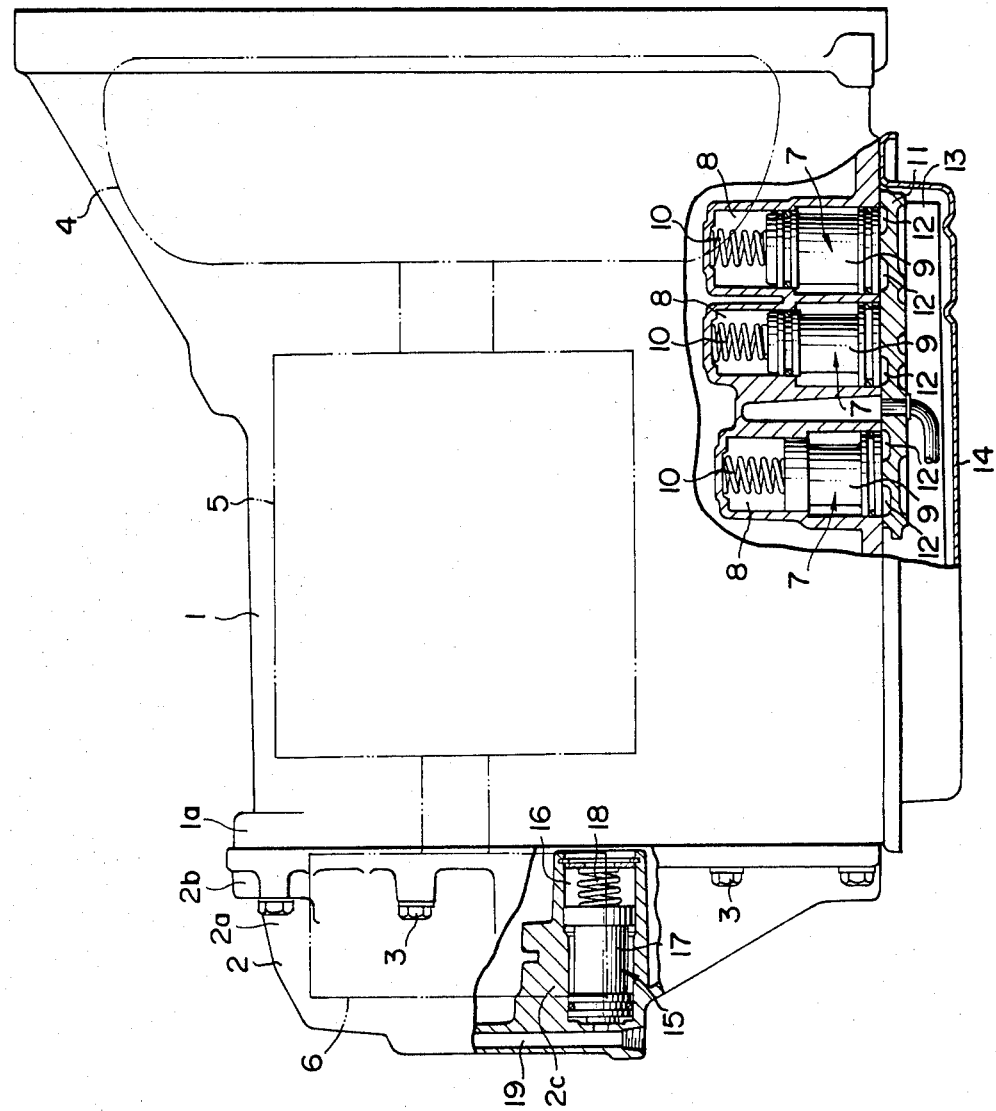

AUTOMATIC TRANSMISSION WITH OVERDRIVE HOUSING INCLUDING ITS OWN ACCUMULATOR

REFERENCE TO DISCLOSURE DOCUMENT

The present invention has been disclosed in Disclosure Document No. 108513, which was received on May 24, 1982 in the mail room of the U.S. Patent and Trademark Office.

BACKGROUND OF THE INVENTION

The present invention relates to a transmission, and more particularly relates to a transmission which incorporates a gear transmission mechanism within a main transaxle casing and an overdrive mechanism within an overdrive casing fixed to said main transaxle casing.

A typical form of automatic transmission system that is produced nowadays for a front engine front wheel drive automotive vehicle or a so called FF configuration automotive type vehicle is configured as a main transaxle casing with an overdrive casing secured to the side of the transaxle casing by bolts or the like. Within the transaxle casing there is provided a gear transmission mechanism, which includes one or more hydraulic fluid pressure actuated friction engaging mechanisms, and which is selectable between a plurality of speed stages (typically three or four forward speed stages and one reverse speed stage) according to selective supply of hydraulic fluid pressure to said hydraulic fluid pressure actuated friction engaging mechanisms. Further, within the overdrive casing there is provided an overdrive mechanism, which again includes one or more hydraulic fluid pressure actuated friction engaging mechanisms, and which is again selectable between a plurality of speed stages (typically in fact two speed stages, one of which is a directly connected speed stage and the other of which is an overdrive or speed increasing speed stage) according to selective supply of hydraulic fluid pressure to said hydraulic fluid pressure actuated friction engaging mechanisms.

The advantage of this form of constructional configuration is that during mass production of an automotive vehicle utilizing such an automatic transmission system it is possible to produce two models of vehicle, one of these models incorporating both the gear transmission mechanism incorporated in the transaxle casing and also the overdrive mechanism incorporated in the overdrive casing as fixed to the transaxle casing, and the other of these models incorporating only the gear transmission mechanism incorporated in the transaxle casing; the former of these models being thus equipped with an automatic transmission system and with an overdrive capability and being the more deluxe of the two models, and the latter of these models being only equipped with the standard automatic transmission system without an overdrive capability and being the less deluxe of the two models. In fact, it is a typical feature of such a transmission system that the differential or final drive mechanism is also housed in the transaxle casing which houses the gear transmission mechanism. Thus, in the case of the first of the models specified above which incorporates an overdrive mechanism, the overdrive mechanism which is housed in the overdrive casing secured to the transaxle casing by bolts or the like receives supply of rotational power from the output side of the gear transmission mechanism and provides supply of rotational power to the input side of the differential mechanism; while on the other hand, in the case of the second of the models specified above which incorporates no overdrive mechanism, no overdrive casing is provided as secured to the transaxle casing, but instead some form of blanking off plate is similarly secured by bolts or the like to said transaxle casing in the place where the overdrive casing was fixed in the case of the first model described above, and the output side of the gear transmission mechanism is directly coupled to the input side of the differential mechanism by some form of direct connection means, so that said output side of the gear transmission mechanism directly provides supply of rotational power to said input side of the differential mechanism. This constructional scheme thus allows for the same transaxle assembly to be utilized in both the two models described above—the model including an overdrive unit and the model not including an overdrive unit—and this provides for considerable economy in manufacture.

As stated above, it is usual for the gear transmission mechanism and the overdrive mechanism both to be hydraulically operated, and each to include one or more hydraulic fluid pressure actuated friction engaging mechanisms, selective supply of hydraulic fluid pressure to which selects the desired speed stage. Thus, of course, a hydraulic fluid pressure control system for the gear transmission mechanism is provided, and also a hydraulic fluid pressure control system for the overdrive mechanism is provided. Now, as is per se well known in the art of such hydraulic fluid pressure control systems, both of these control systems typically comprise one or more hydraulic fluid accumulators, which are typically used for cushioning and absorbing sudden surges of hydraulic fluid pressures which are selectively supplied as actuating hydraulic fluid pressures to various ones of the hydraulic fluid pressure operated friction engaging mechanisms (although alternative possibilities exist).

Now, in the prior art, all these hydraulic fluid pressure accumulators have been housed within the transaxle casing; i.e., the hydraulic fluid pressure accumulator or accumulators which are used for cushioning and absorbing sudden surges of hydraulic fluid pressures which are selectively supplied as actuating hydraulic fluid pressures to various ones of the hydraulic fluid pressure operated friction engaging mechanisms which are incorporated in the gear transmission mechanism are housed within the transaxle casing; and also the hydraulic fluid pressure accumulator or accumulators which are used for cushioning and absorbing sudden surges of hydraulic fluid pressures which are selectively supplied as actuating hydraulic fluid pressures to various ones of the hydraulic fluid pressure operated friction engaging mechanisms which are incorporated in the overdrive mechanism are housed within the transaxle casing.

Now, each of these hydraulic fluid pressure accumulators is relatively large in volume, and accordingly occupies quite a large space within the transaxle casing. Because all these hydraulic fluid pressure accumulators are housed in the transaxle casing, in the prior art, therefore, it becomes difficult to make the transaxle casing compact. Particularly in the case of a modern type front transverse engine front wheel drive automotive vehicle, compactness of the transmission as a whole, and particularly reduction of the axial length of the transmission, is a very important design objective. The disadvantage that has arisen, with a construction as specified above that has been used in the prior art wherein all these hydraulic fluid pressure accumulators are housed in the transaxle casing, is that, when as described above a constructional scheme is implemented which allows for the same transaxle assembly to be utilized in both of two models, one model including an overdrive unit and one model not including an overdrive unit, then in the case that the transaxle assembly is being utilized not in conjunction with an overdrive unit the space in the transaxle casing which is devoted to the hydraulic fluid accumulator or accumulators associated with the overdrive unit is effectively waste space. In view of the importance of maximizing compactness and minimizing axial length of the transmission system as a whole in all of its configurations, this is an important disadvantage.

Another disadvantage that has occurred in connection with the prior art constructional scheme in which all of the hydraulic fluid pressure accumulators, including the accumulator or accumulators pertaining to the overdrive unit, are housed in the transaxle casing, is that when the transaxle casing is utilized in its configuration in conjunction with an overdrive unit then the hydraulic fluid pathway which leads to each of the accumulators pertaining to the overdrive unit from the overdrive unit tends to be rather long; and this can give rise to difficulties connected with the proper control operation of the overdrive unit.

SUMMARY OF THE INVENTION

Accordingly, it is the primary object of the present invention to provide an automatic transmission comprising a transaxle casing and an overdrive casing, in which the transaxle casing and the assembly therein are suitable to be utilized both in conjunction with an overdrive unit housed in such an overdrive casing and alternatively by themselves not in conjunction with any overdrive unit, thus providing for considerable economy in manufacture, without the occurrence of any wasting of space which would occur by the providing of unnecessary space for the provision of an unnecessary hydraulic fluid accumulator for the overdrive unit that is not present, in the latter of the above specified cases.

It is a further object of the present invention to provide an automatic transmission comprising a transaxle casing and an overdrive casing, wherein the spatial arrangement of the accumulators for the main transmission housed in the transaxle casing and the overdrive unit housed in the overdrive casing is improved, as compared to the above described prior art.

It is a further object of the present invention to provide an automatic transmission, wherein the transmission as a whole is compact.

It is a further object of the present invention to provide an automatic transmission, wherein the axial length of the transmission as a whole is minimized.

It is a further object of the present invention to provide an automatic transmission, wherein the transaxle casing is compact.

It is a further object of the present invention to provide an automatic transmission, wherein the axial length of the transaxle casing is minimized.

It is a further object of the present invention to provide an automatic transmission comprising a transaxle casing and an overdrive casing, wherein, when the transaxle casing and the main transmission unit therein are used by themselves without the use of any overdrive unit in conjunction therewith, the compactness of such a transmission is as high as possible.

It is a further object of the present invention to provide an automatic transmission comprising a transaxle casing and an overdrive casing, wherein, when the transaxle casing and the main transmission unit therein are used by themselves without the use of any overdrive unit in conjunction therewith, the axial length of such a transmission is as low as possible.

It is a further object of the present invention to provide an automatic transmission, wherein the length of the hydraulic fluid pathway which leads to each of the accumulators pertaining to the overdrive unit is kept not unacceptably long.

It is a further object of the present invention to provide an automatic transmission, wherein the provision of the hydraulic fluid accumulator for the overdrive unit is more facilitated, utilizing a necessarily existing member, without requiring any special space for mounting it.

According to the present invention, these and other objects are accomplished by an automatic transmission, comprising: (a) a transaxle casing; (b) an overdrive casing fixed to said transaxle casing; (c) a gear transmission mechanism housed within said transaxle casing, comprising a first hydraulic fluid pressure actuated friction engaging mechanism, and selectable between a plurality of speed stages according to selective supply of hydraulic fluid pressure to said first hydraulic fluid pressure actuated friction engaging mechanism; said gear transmission mechanism receiving supply of rotational power, modifying said rotational power according to its selected speed stage, and then outputting said modified rotational power; (d) an overdrive mechanism housed within said overdrive casing, comprising a second hydraulic fluid pressure actuated friction engaging mechanism, and selectable between a plurality of speed stages according to selective supply of hydraulic fluid pressure to said second hydraulic fluid pressure actuated friction engaging mechanism; said overdrive mechanism receiving supply of said modified rotational power from said gear transmission mechanism, again modifying said rotational power according to its selected speed stage, and outputting the thus again modified rotational power; (e) a first control mechanism for said gear transmission mechanism, which selectively supplies hydraulic fluid pressure for actuating said first hydraulic fluid pressure actuated friction engaging mechanism for selecting said gear transmission mechanism to various ones of its speed stages, comprising a first hydraulic fluid accumulator for moderating sudden pressure changes within a part of said first control mechanism, said first hydraulic fluid accumulator being housed within said transaxle csing; and (f) a second control mechanism for said overdrive mechanism, which selectively supplies hydraulic fluid pressure for actuating said second hydraulic fluid pressure actuated friction engaging mechanism for selecting said overdrive mechanism to various ones of its speed stages, comprising a second hydraulic fluid accumulator for moderating sudden pressure changes within a part of said second control mechanism, said second hydraulic fluid accumulator being housed within said overdrive casing.

According to such a structure, since the second hydraulic fluid accumulator is housed, not within the transaxle casing but instead within the overdrive casing, thereby in the case that the overdrive casing and the overdrive housed therein are removed and the transaxle casing and the gear transmission mechanism housed therein are used by themselves as a vehicle transmission, thereby automatically the second hydraulic fluid accumulator is also removed along with the overdrive casing, and is not therefore present and taking up space in the transmission configuration. This is very beneficial with regard to maximizing compactness of the transmission in its configuration wherein the gear transmission mechanism is utilized without the overdrive unit, as well as minimizing its axial length in that configuration. Further, because the second hydraulic fluid accumulator is housed within the overdrive casing and thereby as a matter of course close to the overdrive unit with which it is operationally associated, thereby the hydraulic fluid path which links between said second hydraulic fluid accumulator and the point in the control mechanism for the overdrive mechanism at which the damping action of said second hydraulic fluid accumulator is required is reduced, as compared with the prior art case in which said accumulator relating to the overdrive unit was housed within the main transaxle casing.

Further, according to a particular more specialized aspect of the present invention, these and other objects are more particularly and concretely accomplished by an automatic transmission, comprising: (a) a transaxle casing; (b) an overdrive casing fixed to said transaxle casing; (c) a gear transmission mechanism housed within said transaxle casing, comprising a first hydraulic fluid pressure actuated friction engaging mechanism, and selectable between a plurality of speed stages according to selective supply of hydraulic fluid pressure to said first hydraulic fluid pressure actuated friction engaging mechanism; said gear transmission mechanism receiving supply of rotational power, modifying said rotational power according to its selected speed stage, and then outputting said modified rotational power; (d) an overdrive mechanism housed within said overdrive casing, comprising a second hydraulic fluid pressure actuated friction engaging mechanism, and selectable between a plurality of speed stages according to selective supply of hydraulic fluid pressure to said second hydraulic fluid pressure actuated friction engaging mechanism; said overdrive mechanism receiving supply of said modified rotational power from said gear transmission mechanism, again modifying said rotational power according to its selected speed stage, and outputting the thus again modified rotational power; (e) a first control mechanism for said gear transmission mechanism, which selectively supplies hydraulic fluid pressure for actuating said first hydraulic fluid pressure actuated friction engaging mechanism for selecting said gear transmission mechanism to various ones of its speed stages, comprising at least one gear transmission mechanism hydraulic fluid accumulator for moderating sudden pressure changes within a part of said first control mechanism; and (f) a second control mechanism for said overdrive mechanism, which selectively supplies hydraulic fluid pressure for actuating said second hydraulic fluid pressure actuated friction engaging mechanism for selecting said overdrive mechanism to various ones of its speed stages, comprising at least one overdrive mechanism hydraulic fluid accumulator for moderating sudden pressure changes within a part of said second control mechanism; (g) all hydraulic fluid accumulators for moderating sudden pressure changes within said first control mechanism for said gear transmission mechanism, including said gear transmission mechanism hydraulic fluid accumulator, being housed within said transaxle casing; and (h) all hydraulic fluid accumulators for moderating sudden pressure changes within said second control mechanism for said overdrive mechanism, including said overdrive mechanism hydraulic fluid accumulator, being housed within said overdrive casing.

According to such a structure, since all hydraulic fluid accumulators for said overdrive mechanism, including the second hydraulic fluid accumulator, are housed, not within the transaxle casing but instead within the overdrive casing, thereby in the case that the overdrive casing and the overdrive housed therein are removed and the transaxle casing and the gear transmission mechanism housed therein are used by themselves as a vehicle transmission, thereby automatically all said accumulators including the second hydraulic fluid accumulator are also removed along with the overdrive casing, and are not therefore present and taking up space in the transmission configuration. This is very beneficial with regard to maximizing compactness of the transmission in its configuration wherein the gear transmission mechanism is utilized without the overdrive unit, as well as minimizing its axial length in that configuration, since no space for unwanted accumulators is wasted in that configuration at all. Further, because all hydraulic fluid accumulators for said overdrive mechanism, including said second hydraulic fluid accumulator, are housed within the overdrive casing and thereby as a matter of course close to the overdrive unit with which they are operationally associated, thereby the hydraulic fluid paths which link between said hydraulic fluid accumulators and the points in the control mechanism for the overdrive mechanism at which the damping actions of said second hydraulic fluid accumulators are required are reduced, as compared with the prior art case in which said accumulators relating to the overdrive unit were housed within the main transaxle casing.

Further, according to a particular aspect of the present invention, these and other objects are more particularly and concretely accomplished by a transmission of either of the two sorts detailed above, wherein said transaxle casing has an axial end having an annular flange portion, and said overdrive casing is a cup-like member having an open end defined by an annular flange portion which engages said flange portion of said transaxle casing, said overdrive casing having a thickened portion, which extends towards said open end, said hydraulic fluid accumulator housed within said overdrive casing being incorporated in said thickened portion of said annular wall portion.

According to such a structure, the hydraulic fluid accumulator or accumulators related with the overdrive unit are easily mounted in the overdrive casing by thickening a part of the overdrive casing, and conveniently boring a cylindrical hole or holes for the accumulator or accumulators into the thickened wall portion from the open end of the cup-like overdrive casing. Since the diameter of the cup-like overdrive casing may generally be substantially smaller than the height of the axial end of the transaxle casing, a space for partly thickening the overdrive casing toward the outside thereof will be readily available, without causing any substantial interference with other equipment arranged around the transmission, because such a space is generally a dead space which otherwise will not be effectively utilized.

Further, according to a particular aspect of the present invention, these and other objects are more particularly and concretely accomplished by a transmission of either of the two sorts first detailed above, further comprising a differential mechanism housed within said transaxle casing which receives supply of said doubly modified rotational power from said overdrive mechanism.

According to such a structure, since the power from the overdrive mechanism can be fed back into the transaxle casing to the differential mechanism, thereby it becomes possible to remove the overdrive casing and the overdrive mechanism housed therein, and to fit some form of coupling linking directly the power output member of the gear transmission mechanism with the power input member of the differential mechanism; and thereby the stand alone utilizability of the transaxle casing and of the transmission mechanisms housed therein are promoted.

BRIEF DESCRIPTION OF THE DRAWING

The present invention will now be shown and described with reference to a preferred embodiment thereof, and with reference to the illustrative drawing. It should be clearly understood, however, that the description of the embodiment, and the drawing, are all of them given purely for the purposes of explanation and exemplification only, and are none of them intended to be limitative of the scope of the present invention in any way, since the scope of the present invention is to be defined solely by the legitimate and proper scope of the appended claims. In the drawing, the sole FIGURE thereof is an elevational view of an automatic transmission incorporating a transaxle case and an overdrive mechanism, as seen from the front of an automotive vehicle in which said automatic transmission is fitted, with certain parts thereof shown in fragmentary vertical cross section, said certain parts being those relevant to the present invention.

DESCRIPTION OF THE PREFERRED EMBODIMENT

The present invention will now be described with reference to a preferred embodiment thereof, and with reference to the appended drawing. In the FIGURE, an automatic transmission is shown which comprises a main or transaxle casing 1; and to the left hand side in the FIGURE of this transaxle casing 1 there is fixed an overdrive casing 2; i.e., the transaxle casing 1 has an axial open end defined by an annular flange portion 1a, whereas the overdrive casing 2, which is formed as a cup-like member, has an annular wall portion 2a ending in an annular flange portion 2b which engages the flange portion 1a of the transaxle casing 1. The overdrive casing 2 is secured to the transaxle casing 1 by a plurality of bolts designated in the FIGURE by the reference numerals 3 and arranged along the respective mutually engaged flange portions 1a and 2b of the transaxle casing 1 and the overdrive casing 2. Thus, in this application, the shown automatic transmission incorporates not only the typical set of a plurality of forward speed stages and one reverse speed stage which are provided by the main transmission which is mounted within the transaxle casing 1, but also an overdrive speed stage which is made available by the provision of an overdrive transmission unit within the overdrive casing 2, as will be better understood hereinafter.

Within the transaxle casing 1 there are provided a torque converter 4 and a gear transmission mechanism 5, both of which are of per se well known sorts. The fluid torque converter 4 receives supply of rotational power from an engine not shown in the FIGURE such as an internal combustion engine of an automotive vehicle (also not shown), and after performing a per se well known function of torque conversion and optionally fluid clutch action on this rotational power, supplies it to the input side of the gear transmission mechanism 5. The gear transmission mechanism 5 is of a per se well known type, incorporating at least one planetary gear mechanism and one or more hydraulic fluid pressure actuated friction engaging devices such as hydraulically operated clutches and/or hydraulically operated brakes, and is selected to any one of various speed stages according to the pattern of selective supply or non supply of actuating hydraulic fluid pressures to these various hydraulic fluid pressure actuated friction engaging mechanisms. Thus, this gear transmission mechanism 5 receives at its input side this supply of rotational power from the fluid torque converter 4, and after modifying it according to the speed stage to which said gear transmission mechanism 5 is currently thus selected, outputs this rotational power at its output side. From this output side of the gear transmission mechanism 5, this rotary power is provided to the input side of an overdrive mechanism 6 provided within the overdrive casing 2.

The overdrive mechanism 6 is again of a per se well known type, incorporating at least one planetary gear mechanism and one or more hydraulic fluid pressure actuated friction engaging devices such as hydraulically operated clutches and/or hydraulically operated brakes, and is selected to any one of various speed stages (typically in fact to one of two possible speed stages, a directly connected speed stage and an increasing speed stage) according to the pattern of selective supply or non supply of actuating hydraulic fluid pressures to these various hydraulic fluid pressure actuated friction engaging mechanisms. Thus, this overdrive mechanism 6 receives at its input side this supply of rotational power from the gear transmission mechanism 5, and after modifying it according to the speed stage to which said overdrive mechanism 6 is currently thus selected, outputs this rotational power at its output side. From this output side of the overdrive mechanism 6, this rotary power is provided to the input side of a differential mechanism which is not shown because it is not relevant to the present invention, but which is typically provided within the transaxle casing 1. In fact, typically, this output side of the overdrive mechanism 6 is connected to the input side of the differential mechanism within the transaxle casing 1 by a countershaft or power output shaft which passes under the gear transmission mechanism 5; but this is not directly relevant to the present invention either.

The particular details of the control mechanism which selectively supplies and does not supply the various actuating hydraulic fluid pressures to the various hydraulic fluid pressure actuated friction engaging mechanisms within the gear transmission mechanism 5, in order to select said gear transmission mechanism 5 to the currently appropriate one of its various speed stages as described above, will not be particularly described here. However, this control mechanism for the gear transmission mechanism 5 comprises three hydraulic accumulators which are shown in the FIGURE, and which are designated by the reference numerals 7. Typically, in fact, these accumulators may be provided so as to perform the functions of cushioning and absorbing sudden surges of hydraulic fluid pressures which are selectively supplied as actuating hydraulic fluid pressures to various ones of the hydraulic fluid pressure operated friction engaging mechanisms within the gear transmission mechanism 5; but alternative possibilities exist. In any case, each of these gear transmission mechanism accumulators 7 is provided within the transaxle casing 1, and comprises a cylinder bore 8 defined within said transaxle casing 1, an accumulator piston 9 which slidingly reciprocates within said cylinder bore 8, and a compression coil spring 10 which biases said accumulator piston 9 in the downwards direction in the FIGURE so as to tend to diminish the size of an accumulator chamber defined within the bore 8 below the accumulator piston 9 in the FIGURE. A cover plate 11, common to all the three accumulators 7, closes the lower ends in the FIGURE of the cylinder bores 8; and this cover plate 11 is formed with a plurality of hydraulic fluid passages 12 for connection of each of the accumulators 7 to its appropriate point in the hydraulic fluid circuits of the hydraulic fluid pressure control mechanism 5.

Further, in the lower part as seen in the FIGURE of the transaxle casing 1 there is provided a valve body 13 for controlling selective supply of the various actuating hydraulic fluid pressures to the various hydraulic fluid pressure actuated friction engaging mechanisms within the gear transmission mechanism 5, in order to select said gear transmission mechanism 5 to the currently appropriate one of its various speed stages, and below this valve body 13 there is fitted an oil pan 14.

Likewise, the particular details of the control mechanism which selectively supplies and does not supply the various actuating hydraulic fluid pressures to the various hydraulic fluid pressure actuated friction engaging mechanisms within the overdrive mechanism 6, in order to select said overdrive mechanism 6 to the currently appropriate one of its various speed stages as described above, will not be particularly described here. However, this control mechanism for the overdrive mechanism 6 comprises one hydraulic accumulator which is shown in the FIGURE, and which is designated by the reference numeral 15. Typically, in fact, this accumulator may be provided so as to perform the function of cushioning and absorbing sudden surges of a hydraulic fluid pressure which is selectively supplied as a actuating hydraulic fluid pressure to one of the hydraulic fluid pressure operated friction engaging mechanisms within the overdrive mechanism 6; but alternative possibilities exist. In any case, according particularly to the concept of the present invention, this overdrive mechanism accumulator 15 is provided within the overdrive casing 2, and comprises a cylinder bore 16 defined within said overdrive casing 2, as particularly formed in a thickened portion 2c of the cup-like overdrive casing 2 and bored from the open end of the cup-like overdrive casing 2, an accumulator piston 17 which slidingly reciprocates within said cylinder bore 16, and a compression coil spring 18 which biases said accumulator piston 17 in the downwards direction in the FIGURE so as to tend to diminish the size of an accumulator chamber defined within the bore 16 below the accumulator piston 17 in the FIGURE. The left hand end in the FIGURE of the cylinder bore 16 communicates via a hydraulic fluid passage 19 to its appropriate point in the hydraulic fluid circuits of the overdrive mechanism 6.

In fact, in the shown preferred embodiment of the transmission according to the present invention, the hydraulic fluid accumulator 15 which relates to the overdrive mechanism 6 and which helps to control the operation of said overdrive mechanism 6, and which according to the present invention is housed in the overdrive casing 2 as explained above, is the only such hydraulic fluid accumulator operationally associated with the overdrive mechanism 6.

According to such a structure, since the hydraulic fluid accumulator 15 is housed, not within the transaxle casing 1 but instead within the overdrive casing 2, thereby in the case that the overdrive casing 2 and the overdrive mechanism 6 housed therein are removed and the transaxle casing 2 and the gear transmission mechanism 5 housed therein are used by themselves as a vehicle transmission—this may be typically done, as is per se well known in the art, by removing the overdrive casing 2 and the overdrive mechanism 6 housed therein and by substituting therefor a connection member which directly connects the power output member (not shown) of the gear transmission mechanism 5 to the power input member (also not particularly shown) of the differential mechanism—thereby automatically the hydraulic fluid accumulator 15 for the overdrive mechanism 6 is also removed along with the overdrive casing 2, and is not therefore present and taking up space in the transmission configuration. This is very beneficial with regard to maximizing compactness of the transmission in its configuration wherein the gear transmission mechanism 5 is utilized without the overdrive mechanism 6, as well as minimizing its axial length in that configuration. Further, because the hydraulic fluid accumulator 15 is housed within the overdrive casing 2 and thereby as a matter of course close to the overdrive mechanism 6 with which it is operationally associated, thereby the hydraulic fluid passage (not shown) which links between said hydraulic fluid accumulator 15 and the point in the control mechanism for the overdrive mechanism 6 at which the damping action of said hydraulic fluid accumulator 15 is required is reduced, as compared with the prior art case in which the accumulators relating to the overdrive mechanism were all housed within the main transaxle casing.

It should be noted, in addition, that because as stated above the hydraulic fluid accumulator 15 which relates to the overdrive mechanism 6 and which helps to control the operation of said overdrive mechanism 6, and which according to the present invention is housed in the overdrive casing 2 as explained above, is in fact the only such hydraulic fluid accumulator operationally associated with the overdrive mechanism 6, thereby it is the case that all the hydraulic fluid accumulators relating to the overdrive mechanism 6 are housed within the overdrive casing 2. This particular feature of the present invention means that the above explained reduction of waste of space, in the case that the transaxle casing 2 and the mechanisms housed therein are used by themselves without any overdrive unit, is carried out to its logically maximum extent.

Although the present invention has been shown and described with reference to a preferred embodiment thereof, and in terms of the illustrative drawing, it should not be considered as limited thereby. Various possible modifications, omissions, and alterations could be conceived of by one skilled in the art to the form and the content of any particular embodiment, without departing from the scope of the present invention. Therefore it is desired that the scope of the present invention, and of the protection sought to be granted by Letters Patent, should be defined not by any of the perhaps purely fortuitous details of the shown embodiment, or of the drawing, but solely by the scope of the appended claims, which follow.

What is claimed is:

1. An automatic transmission, comprising:
   (a) a transaxle casing;
   (b) an overdrive casing constructed separately and assembled together with said transaxle casing;
   (c) a gear transmission mechanism housed within said transaxle casing, comprising a first hydraulic fluid pressure actuated friction engaging mechanism, and selectable between a plurality of speed stages according to selective supply of hydraulic fluid pressure to said first hydraulic fluid pressure actuated friction engaging mechanism; said gear transmission mechanism receiving a supply of rotational power, modifying said rotational power according to its selected speed stage, and then outputting modified rotational power;
   (d) an overdrive mechanism housed within said overdrive casing and drivingly interconnected with said transmission mechanism, comprising a second hydraulic fluid pressure actuated friction engaging mechanism, and selectable between a plurality of speed stages according to selective supply of hydraulic fluid pressure to said second hydraulic fluid pressure actuated friction engaging mechanism; said overdrive mechanism receiving supply of rotational power, modifying said rotational power according to its selected speed stage, and then outputting modified rotational power;
   (e) a first control mechanism for said gear transmission mechanism, which selectively supplies hydraulic fluid pressure for actuating said first hydraulic fluid pressure actuated friction engaging mechanism for selecting said gear transmission mechanism to various ones of its speed stages, comprising a first hydraulic fluid accumulator for moderating sudden pressure changes within a part of said first control mechanism, said first hydraulic fluid accumulator being incorporated in said transaxle casing; and
   (f) a second control mechanism for said overdrive mechanism, which selectively supplies hydraulic fluid pressure for actuating said second hydraulic fluid pressure actuated friction engaging mechanism for selecting said overdrive mechanism to various ones of its speed stages, comprising a second hydraulic fluid accumulator separate from said first hydraulic fluid accumulator for moderating sudden pressure changes within a part of said second control mechanism, said second hydraulic fluid accumulator being incorporated in said overdrive casing.

2. An automatic transmission according to claim 1, wherein said transaxle casing has an axial end having an annular flange portion, and said overdrive casing is a cup-like member having an open end defined by an annular flange portion which engages said flange portion of said transaxle casing, said overdrive casing having a thickened portion, which extends towards said open end, said hydraulic fluid accumulator being incorporated in said thickened portion of said annular wall portion.

* * * * *